(12) United States Patent
Oh et al.

(10) Patent No.: US 7,457,053 B2
(45) Date of Patent: Nov. 25, 2008

(54) SUBMINIATURE IMAGING OPTICAL SYSTEM

(75) Inventors: Hye Ran Oh, Gyunggi-do (KR); Ho Seop Jeong, Gyunggi-do (KR); Dong Ik Shin, Gyunggi-do (KR); Ho Sik You, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 11/826,974

(22) Filed: Jul. 19, 2007

(65) Prior Publication Data

US 2008/0088949 A1    Apr. 17, 2008

(30) Foreign Application Priority Data

Oct. 16, 2006  (KR) ...................... 10-2006-0100151

(51) Int. Cl.
*G02B 9/04*  (2006.01)
*G02B 9/00*  (2006.01)
*G02B 13/18* (2006.01)

(52) U.S. Cl. .................. 359/793; 359/717; 359/796; 359/797

(58) Field of Classification Search .................. 359/692, 359/793, 796, 797, 717, 656–661
See application file for complete search history.

(56) References Cited

U.S. PATENT DOCUMENTS

2003/0193605 A1* 10/2003 Yamaguchi .................. 348/335

FOREIGN PATENT DOCUMENTS

WO  WO 2004/027880 A2   4/2004
WO  WO 2005/073778 A1   8/2005

* cited by examiner

*Primary Examiner*—Jordan M. Schwartz
*Assistant Examiner*—James C Jones (57) ABSTRACT

A subminiature imaging optical system includes a first lens including a first lens part having a convex object-side surface, a second lens part having an object-side surface in contact with an image-side surface of the first lens part, and a third lens part having an object-side surface in contact with an image-side surface of the second lens part and a concave image-side surface, about the optical axis; and a second lens including a fourth lens part having an object-side surface with a convex center and a concave peripheral portion about the optical axis, a fifth lens part having an object-side surface in contact with an image-side surface of the fourth lens part, and a sixth lens part having an object-side surface in contact with an image-side surface of the fifth lens part, and an image-side surface with a concave center and a convex peripheral portion about the optical axis.

24 Claims, 6 Drawing Sheets

SUBMINIATURE IMAGING OPTICAL SYSTEM

CLAIM OF PRIORITY

This application claims the benefit of Korean Patent Application No. 2006-0100151 filed on Oct. 16, 2006, in the Korean Intellectual Property Office, the disclosure of which is incorporated herein by reference.

BACKGROUND OF THE INVENTION

1. Field of the Invention

The present invention relates to an imaging optical system, and more particularly, to a subminiature imaging optical system mounted on a mobile communication terminal, personal digital assistant (PDA) and the like or used in a surveillance camera, a digital camera and the like.

2. Description of the Related Art

In general, mobile communication terminals had only functions of basic communication at their incipient stage. However, with increased use, the mobile communication terminals are required to have diversified functions ranging from photographing to image transmission and video communication, continuously evolving in their functions and services. Recently, a new expanded concept of mobile communication terminal by integrating digital camera technology with mobile phone technology, i.e., so called camera phones or camera mobile phones are significantly attracting attention.

In particular, the imaging optical system mounted on the camera phone is not only required to be miniaturized, lightweight and low cost, but also have high resolution since the pixel size of an image sensor formed of a charge coupled device (CCD) or a complementary metal oxide semiconductor (CMOS) used in the imaging optical system is decreasing.

In order to satisfy miniaturization and low cost, the imaging optical system mounted on a small device such as a mobile phone needs to have a small number of lenses as possible, but this restricts a degree of freedom in designing and undermines the optical capabilities.

Therefore, there is required a subminiature imaging optical system which is easily miniaturized while having high resolution and excellent aberrational characteristics.

SUMMARY OF THE INVENTION

An aspect of the present invention provides a subminiature imaging optical system, which can efficiently correct various aberrations such as chromatic aberration, distortion, aspherical aberration, spherical aberration and field curvature, with a small number of lenses.

An aspect of the invention also provides a subminiature imaging optical system which is ultra-miniaturized and has high resolution, using only two sheets of lenses.

An aspect of the invention also provides a subminiature image forming optical system having various excellent optical capacities while facilitating mass production.

According to an aspect of the invention, there is provided a subminiature imaging optical system including a first lens having a positive refractive power and including a first lens part having a convex object-side surface, a second lens part having an object-side surface in contact with an image-side surface of the first lens part, and a third lens part having an object-side surface in contact with an image-side surface of the second lens part and a concave image-side surface, about an optical axis; and a second lens including a fourth lens part having an object-side surface with a convex center and a concave peripheral portion, a fifth lens part having an object-side surface in contact with an image-side surface of the fourth lens part, and a sixth lens part having an object-side surface in contact with an image-side surface of the fifth lens part, the sixth lens part having an image-side surface with a concave center and a convex peripheral portion, about the optical axis.

The first lens may have a refractive power according to following condition 1:

$$1.3 \leq f1/f \leq 1.7 \qquad \text{condition 1}$$

wherein f1 is a focal length of the first lens and f is a total focal length of the optical system.

The third lens part may have shapes according to following condition 2:

$$H1 \geq 30 \, \mu m \qquad \text{condition 2}$$

wherein H1 is a largest sag value within an effective aperture of the third lens part, in which H1 is greater than 0, when a sag is designated as a difference between a thickness at an arbitrary position within an effective aperture of the lens and a thickness of a lens along an optical axis, based on the thickness of the lens along the optical axis.

The fourth lens part may have shapes according to following condition 3:

$$H2 \leq -30 \, \mu m \qquad \text{condition 3}$$

wherein H2 is a smallest sag value within an effective aperture of the fourth lens part, in which H2 is less than 0, when a sag is designated as a difference between a thickness at an arbitrary position within an effective aperture of the lens and a thickness of a lens along an optical axis, based on the thickness of the lens along the optical axis.

The sixth lens part may have shapes according to following condition 4:

$$50 \, \mu m \leq H3 \leq 140 \, \mu m \qquad \text{condition 4}$$

wherein H3 is a largest sag value within an effective aperture of the fourth lens part, in which H3 is greater than 0, when a sag is designated as a difference between a thickness at an arbitrary position within an effective aperture of the lens and a thickness of a lens along an optical axis, based on the thickness of the lens along the optical axis.

H3 may have a value from about 100 μm to 140 μm.

At least one of the first lens part, the second lens part and the third lens part may have a refractive index different from others, and at least one of the fourth lens part, the fifth lens part and the sixth lens part may have a refractive index different from others.

The object-side surfaces and the image-side surfaces of at least one of the second lens part and the fifth lens part may be formed of a planar surface.

At least one of the object-side surface and the image-side surface of the second lens part and the object-side surface and the image-side surface of the fifth lens part may be formed of an aspherical surface.

The second lens may have a positive refractive power.

The present invention provides a subminiature imaging optical system capable of effectively correcting various aberrations such as chromatic aberration, distortion, astigmatism, spherical aberration and field curvature, with two lenses each made up of three lens parts.

In addition, the present invention also provides an optical system which is ultra-miniaturized and has high resolution, while having only two sheets of lenses.

Further, the present invention also provides a subminiature imaging optical system with excellent capacity, which facilitates mass production since a replica method can be employed.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 1:
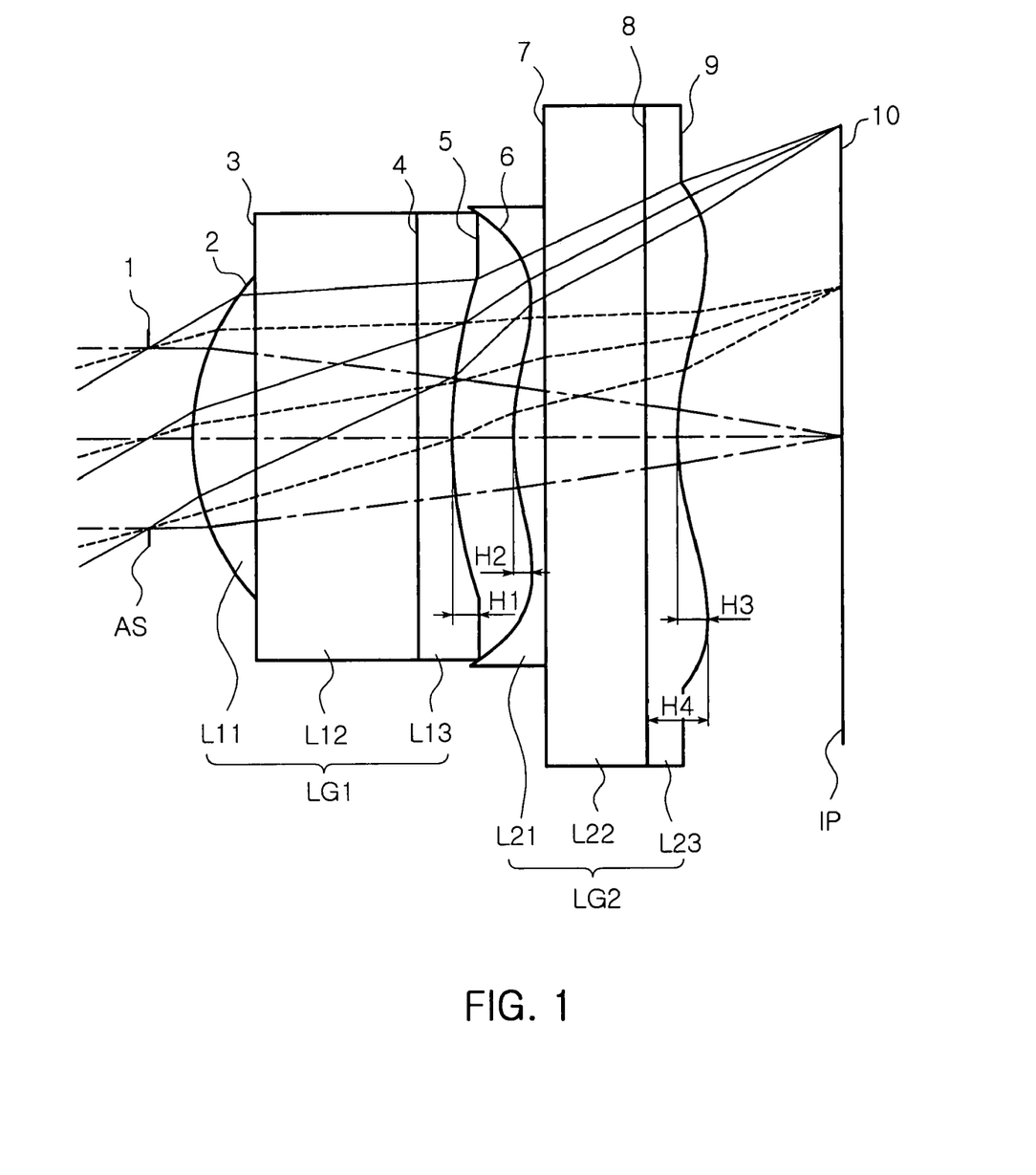
FIG. 1 is a view illustrating a lens arrangement of a subminiature imaging optical system according to a first embodiment of the present invention.

FIG. 1 is a view illustrating a lens arrangement of a subminiature imaging optical system according to a first embodiment of the present invention. In the following views illustrating the lens arrangement, the thicknesses, dimensions and shapes of the lenses may be exaggerated for clarity. In particular, the shapes of the spherical or aspherical surfaces shown in the views are only exemplary and should not be construed as limiting.

As shown in FIG. 1, the subminiature imaging optical system according to an embodiment of the present invention includes, sequentially from an object side, an aperture stop AS, a first lens LG1, a second lens LG2, and an image sensor corresponding to an image plane IP.

The first lens LG1 has an overall positive refractive power and includes three lens parts: a first lens part L11 having a convex object-side surface 2 about an optical axis, a second lens part L12 having an object-side surface 3 in contact with an image-side surface of the first lens part L11, and a third lens part L13 having an object-side surface in contact with an image-side surface of the second lens part L12 and a concave image-side surface 5 about the optical axis.

In addition, the second lens LG2 includes three lens parts: a fourth lens part L21 having an object-side surface 6 with a convex center and a concave peripheral portion about the optical axis, a fifth lens part L22 having an object-side surface 7 in contact with an image-side surface of the fourth lens part L21, and a sixth lens part L23 having an object-side surface 8 in contact with an image-side surface of the fifth lens part L22 and an image-side surface 9 with a concave center and a convex peripheral portion about the optical axis.

In addition, the image sensor corresponds to an image plane IP and is formed of a charge coupled device (CCD), a complementary metal oxide semiconductor (CMOS) and the like, thereby sensing a light image passed through the first lens LG1 and the second lens LG2 and converting the image to an electric signal.

In addition, the aperture stop AS is installed in front of the object-side surface 2 of the first lens LG1.

In the meantime, an ultraviolet filter and a cover glass corresponding to an optical low pass filter, a chromatic filter and a face plate may be installed behind the second lens LG2 but do not have a substantial effect on the optical characteristics of the optical system of the present invention.

In the optical system according to the present invention, the overall length of the optical system is shortened through the first lens LG1 having a strong positive refractive power, thereby achieving miniaturization, and the second lens LG2 is configured to have a weak positive refractive power or a weak negative refractive power. Moreover, the second lens LG2 includes the fourth lens part L21 having the object-side surface 6 with a convex center and a concave peripheral portion about the optical axis, and the sixth lens part L23 having the image-side surface 9 with a concave center and a convex peripheral portion about the optical axis, thereby correcting the aberrations such as spherical aberration, astigmatism, distortion and field of curvature.

In addition, according to the present invention, as shown in FIG. 1, the first lens part L11 and the third lens part L13 of the first lens LG1 are configured to contact the object-side surface 3 and the image-side surface 4 of the second lens part L12, respectively.

At this time, the first lens LG1 may be formed via a replica method, in which polymer is stacked on opposite surfaces of the second lens part L2 serving as a lens substrate to form the first lens part L11 and the third lens part L13. As described above, mass production may be easy when forming a wafer-scale lens via the replica method.

However, as long as at least one of the first lens part L11, the second lens part L12 and the third lens part L13 has a refractive index different from others, it is not necessarily limited to manufacture the first lens LG1 via the replica method. That is, if some of the three lens parts constituting the first lens LG1 can be configured to have different refractive indices so that aberrations such as chromatic aberration can be corrected, the first lens LG1 according to an embodiment of the present invention may be manufactured by a general method of manufacturing a doublet lens.

In addition, according to the present invention, as shown in FIG. 1, the fourth lens part L21 and the sixth lens part L23 of the second lens LG2 are configured to contact the object-side surface 7 and the image-side surface 8 of the fifth lens part L22, respectively.

At this time, similar to the aforedescribed first lens LG1, the second lens LG2 may be formed via the replica method in which polymer is stacked on opposite surfaces of the fifth lens part L22 serving as a lens substrate to form the fourth lens part L21 and the sixth lens part L23. However, as long as at least one of the fourth lens part L21, the fifth lens part L22 and the sixth lens part L23 can be configured to have a refractive index different from others, the second lens LG2 may be manufactured by a general method of manufacturing a doublet lens.

In addition, in the drawings of the lens arrangements like FIG. 1, all of the object-side surfaces 3 and 7 and the image-side surfaces 4 and 8 of the second lens part L12 and the fifth lens part L22 are illustrated to be formed of a planar surface, but the present invention is not limited thereto.

That is, in order to apply the general replica method which facilitates mass production, opposite surfaces (the object-side surface and the image-side surface) of each of the second lens part L12 and the fifth lens part L22 may be formed of a planar surface. However, in the case where a general method of manufacturing a doublet lens is applied, at least one of refractive surfaces, the image-side surfaces and the object-side surfaces of the second lens part L12 and the fifth lens part L22 may be formed of one of a spherically curved surface and an aspherically curved surface. As described above, when the at least one of the refractive surfaces is formed of the curved surface, the optical system has an increased refractive power, having an improved degree of freedom in designing and excellent various optical characteristics.

In addition, the subminiature imaging optical system according to an embodiment of the present invention may be provided with excellent aberrational characteristics and high resolution by forming an aspherically curved surface and improving a radius of curvature of the refractive surfaces.

With this overall configuration, operational effects of following conditions 1 to 4 will be examined hereunder.

$$1.3 \leq f1/f \leq 1.7 \qquad \text{condition 1}$$

In this case, f1 is a focal length of the first lens LG1 and f is a total focal length of the optical system.

Condition 1 is a ratio of the focal length of the first lens LG1 to the total focal length, designating the refractive power of the first lens LG1.

Deviation from the lower limit of condition 1 results in too large a power of the first lens LG1, hindering correction of spherical aberration and making it difficult to secure a suitable back focal length (BFL).

In addition, deviation from the upper limit of condition 1 causes a decrease in the power of the first lens, hindering miniaturization and shortening the distance between the third lens part L13 of the first lens LG1 and the fourth lens part L21 of the second lens LG2. This can lead to the two lens parts L13 and L21 placed too close to or in contact with each other, which results in deterioration of assemblability.

$$H1 \geq 30 \, \mu m \qquad \text{condition 2}$$

In this case, H1 denotes a largest sag value within an effective aperture of the third lens part L13 when a sag is designated as a difference between a thickness at an arbitrary position within an effective aperture of the lens and a thickness of a lens along an optical axis, based on the thickness of the lens along the optical axis. The value of sag is positive if the thickness at an arbitrary position within the effective aperture is greater than the thickness of the lens along an optical axis, or is negative if the thickness at an arbitrary position within the effective aperture is smaller than the thickness of the lens along the optical axis. That is, since the third lens part L13 has a concave image-side surface about an optical axis, the sag value of the third lens part L13 at the peripheral portion thereof is positive and is the largest within the effective aperture of the third lens part.

Condition 2 designates the shape of the third lens part L13, pertaining to correction of astigmatism in the peripheral field of the optical system.

That is, if the largest sag value H1 of the third lens part L13 deviates from the lower limit of condition 2 and becomes less than 30 µm, it will be difficult to correct astigmatism in the peripheral field of the optical system.

$$H2 \leq -30 \, \mu m \qquad \text{condition 3}$$

In this case, H2 denotes a smallest sag value within an effective aperture of the fourth lens part L21 when a sag is designated as a difference between a thickness at an arbitrary position within an effective aperture of the lens and a thickness of a lens along an optical axis, based on the thickness of the lens along the optical axis. The value of the sag is positive if the thickness at an arbitrary position within the effective aperture is greater than the thickness of the lens along the optical axis, or is negative if the thickness at an arbitrary position within the effective aperture is smaller than the thickness of the lens along the optical axis. That is, since the fourth lens part L21 has an image-side surface with a convex center and a concave peripheral portion about the optical axis, the sag value H2 of the fourth lens part L21 at the peripheral portion thereof is negative.

Condition 3 designates the shape of the fourth lens part L21, pertaining to correction of astigmatism in the peripheral field of the optical system.

That is, if the smallest sag value H2 of the fourth lens part L21 deviates from the upper limit of condition 3 and becomes larger than −30 µm (if the difference between the thickness along the optical axis and the thickness at an arbitrary position within the effective aperture, based on the thickness of the lens along the optical axis, is less than 30 µm), it becomes difficult to correct astigmatism in the peripheral field of the optical system.

$$50 \, \mu m \leq H3 \leq 140 \, \mu m \qquad \text{condition 4}$$

In this case, H3 denotes a largest sag value within an effective aperture of the sixth lens part L23 when a sag is designated as a difference between a thickness at an arbitrary position within an effective aperture of the lens and a thickness of a lens along an optical axis, based on the thickness of the lens along the optical axis. The sag value is positive if the thickness at an arbitrary position within the effective aperture is larger than the thickness of the lens along the optical axis, or is negative if the thickness at an arbitrary position within the effective aperture is smaller than the thickness of the lens along the optical axis. That is, as the sixth lens part L23 has an image-side surface with a concave center and a convex peripheral portion about the optical axis, the sag value H3 of the sixth lens element L23 at the peripheral portion thereof is negative.

Condition 4 designates the shape of the sixth lens part L23.

If the largest sag value H3 of the sixth lens part L23 at the peripheral portion thereof deviates from the upper limit of condition 4 and exceeds 140 µm, the thickness of the thickest part of the sixth lens part L23 (the value obtained by adding H3 and the thickness of the sixth lens part along an optical axis) (see H4 in FIG. 1) becomes too large, hindering manufacture via the replica method. That is, in the replica method, it is difficult to form polymer with a largest height (thickness) of about 250 µm or more due to constriction of the polymer, and thus the largest sag value H3 of the sixth lens element L23 at the peripheral portion thereof may be 140 µm or less.

In addition, if the largest sag value H3 of the sixth lens part L23 at the peripheral portion thereof deviates from the lower limit of condition 4 and becomes less than 50 µm, a great amount of distortion may occur.

In the meantime, in order to further decrease such distortion, the largest sag value H3 of the sixth lens part L23 at the peripheral portion thereof may be at least 100 µm.

In this case, condition 4 is 100 µm ≦ H3 ≦ 140 µm.

Figure 2:
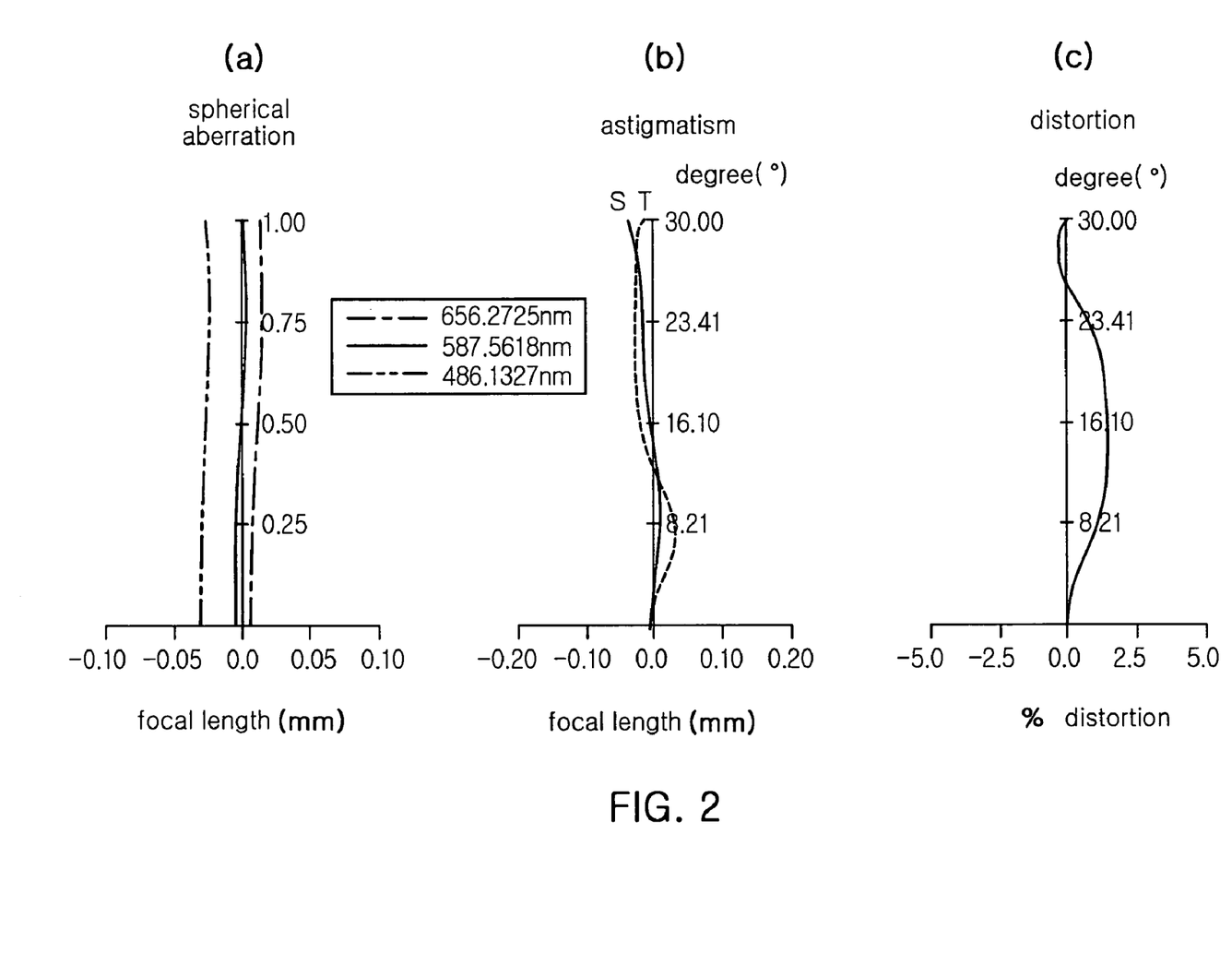
FIG. 2 illustrates aberrational characteristics of the embodiment shown in FIG. 1, in which (a) shows spherical aberration, (b) shows astigmatism and (c) shows distortion.
Figure 6:
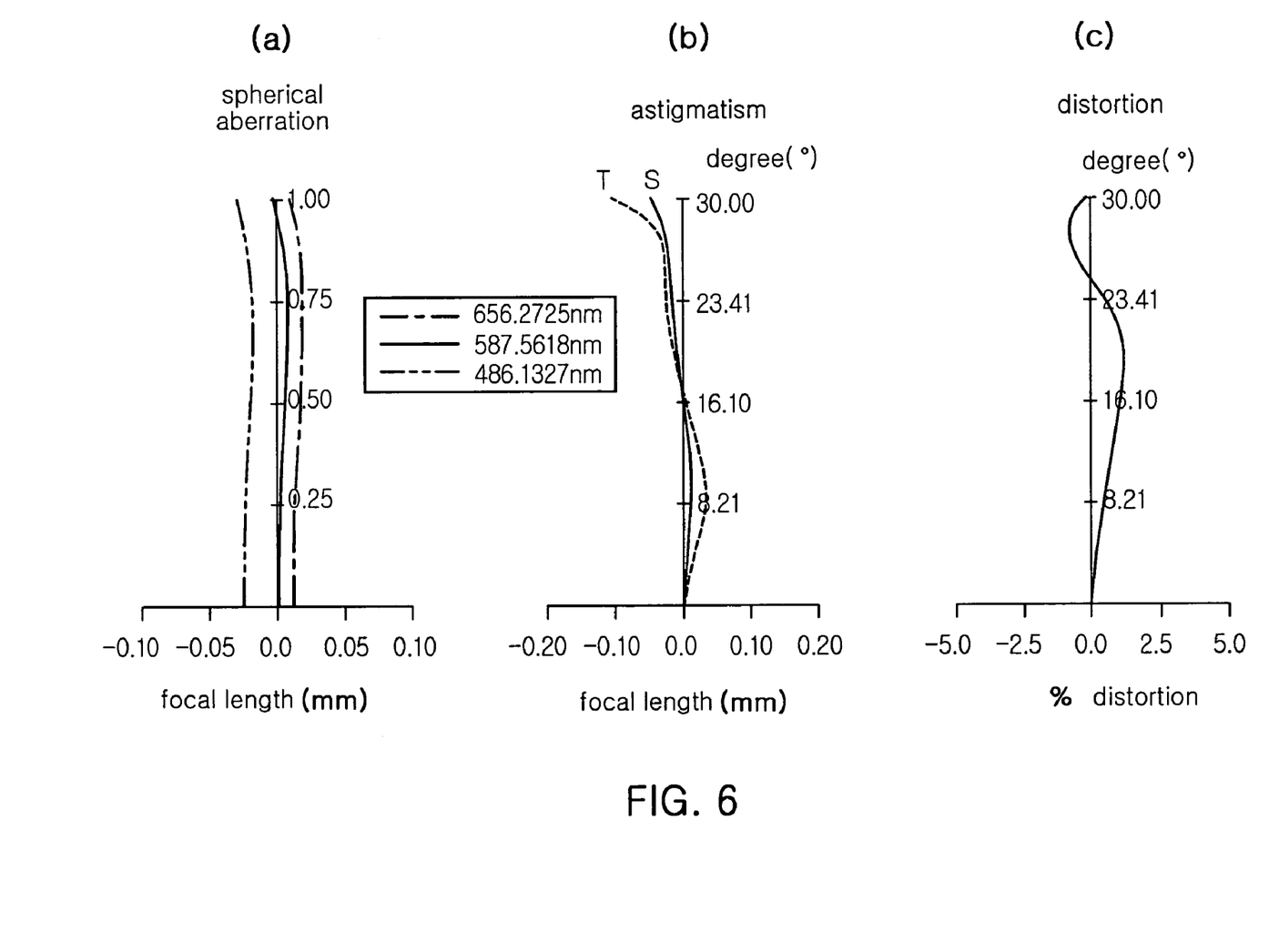
FIG. 6 illustrates aberrational characteristics of the embodiment shown in FIG. 5, in which (a) shows spherical aberration, (b) shows astigmatism and (c) shows distortion.

For example, it can be confirmed that the distortion in the first embodiment shown in FIG. 2(c) and the third embodiment shown in FIG. 6(c), where H3 is at least 100 µm, is much smaller than the distortion in the second embodiment, where H3 is 50 µm.

Now, the present invention will be examined in greater detail through specific numerical examples.

As described above, in the following first to third embodiments, the subminiature imaging optical system of the present invention includes, sequentially from an object side, an aperture stop AS, a first lens LG1, a second lens LG2, and an image sensor (not shown) corresponding to an image plane IP, as shown in FIG. 1.

The first lens LG1 has an overall positive refractive power, and includes three lens parts: a first lens part L11 having a convex object-side surface; a second lens part L12 having an object-side surface 3 in contact with an image-side surface of the first lens part L11; and a third lens part L13 having an object-side surface 4 in contact with an image-side surface of the second lens part L12 and a concave image-side surface 5, about an optical axis.

In addition, the second lens LG2 also includes three lens parts: a fourth lens part L21 having an object-side surface with a convex center and a concave peripheral portion; a fifth lens part L22 having an object-side surface 7 in contact with an image-side surface of the fourth lens part L21; and a sixth lens part L23 having an object-side surface 8 in contact with an image-side surface of the fifth lens part L22 and an image-side surface 9 with a concave center and a convex peripheral portion, about the optical axis.

In addition, the image sensor is located at the image plane IP, the aperture stop AS is installed in front of the object-side surface 2 of the first lens LG1, and an optical filter including an ultra-violet filter, a cover glass and the like may be provided between the second lens LG2 and the image plane IP.

Each of the aspherical surfaces used in each of the embodiments herein is obtained from following Equation 1.

$$Z = \frac{cY^2}{1+\sqrt{1-(1+K)c^2Y^2}} + AY^4 + BY^6 + CY^8 + DY^{10} + EY^{12} + FY^{14} + \ldots \quad \text{Equation 1}$$

where Z is a distance from the vertex of lens in the optical axis direction, Y is a distance in the direction perpendicular to the optical axis, c is a reciprocal of radius r of curvature on vertex of lens, K is a conic constant and A, B, C, D, E and F are aspherical coefficients.

First Embodiment

Table 1 below shows numerical values according to the first embodiment of the present invention.

FIG. 1 is a view of a lens arrangement of the subminiature image forming optical system according to the first embodiment of the present invention, and FIG. 2 shows aberrations of the first embodiment shown in FIG. 1, in which (a) is spherical aberration, (b) is astigmatism and (c) is distortion. In the following diagrams showing astigmatism, "S" represents sagital and "T" represents tangential.

In the first embodiment, the angle of view is 60 degrees, the distance from an aperture stop surface 1 to the image plane 10 is 2.73 mm, the effective focal length f of the optical system is 2.073 mm, the focal length f1 of the first lens LG1 is 3.5 mm, and the focal length f2 of the second lens LG2 is 4.227. In addition, the largest sag value H1 of the third lens part L13 is 94 μm, the smallest sag value H2 of the fourth lens part L21 is −74 μm, the sag value within the effective aperture of the fourth lens part L21 is 35 μm, and the largest sag value H3 of the sixth lens part L23 is 117 μm.

The unit for the radius of curvature R, the thickness or the distance t is mm.

TABLE 1

| Surface No. | Radius of curvature R | Thickness or distance t | Refractive index $N_d$ | Abbe number $V_d$ | Other |
|---|---|---|---|---|---|
| 1 | ∞ | 0.1736 | | | Aperture stop |
| *2 | 0.8962 | 0.2500 | 1.4431 | 49 | The |
| 3 | ∞ | 0.6500 | 1.474 | 65.4 | first |
| 4 | ∞ | 0.1300 | 1.4821 | 51.3 | lens |
| *5 | 1.5091 | 0.2382 | | | |
| *6 | 0.7668 | 0.1300 | 1.4431 | 49 | The |
| 7 | ∞ | 0.4000 | 1.474 | 65.4 | second |
| 8 | ∞ | 0.1200 | 1.4431 | 49 | lens |
| *9 | 0.9645 | 0.6426 | | | |
| 10 | ∞ | — | | | Image plane |

In addition, in Table 1, the symbol * represents an aspherical surface, and in the first embodiment, the second surface (the object-side surface of the first lens part), the fifth surface (the image-side surface of the third lens part), the sixth surface (the object-side surface of the fourth lens part) and the ninth surface (the image-side surface of the sixth lens part) are aspherical.

The values of aspherical coefficients in the first embodiment according to Equation 1 are as follows in Table 2.

TABLE 2

| Surface No. | K | A | B | C |
|---|---|---|---|---|
| 2 | 0.387253 | −0.20637 | 0.42681 | −1.4012 |
| 5 | −60.6302 | 0.092441 | −0.15807 | 1.712092 |
| 6 | −11.5394 | −0.10171 | −1.27403 | 0.841102 |
| 9 | −7.06865 | −0.10144 | −0.25405 | 0.085971 |

Second Embodiment

Table 3 shows numerical values according to the second embodiment of the present invention.

Figure 3:
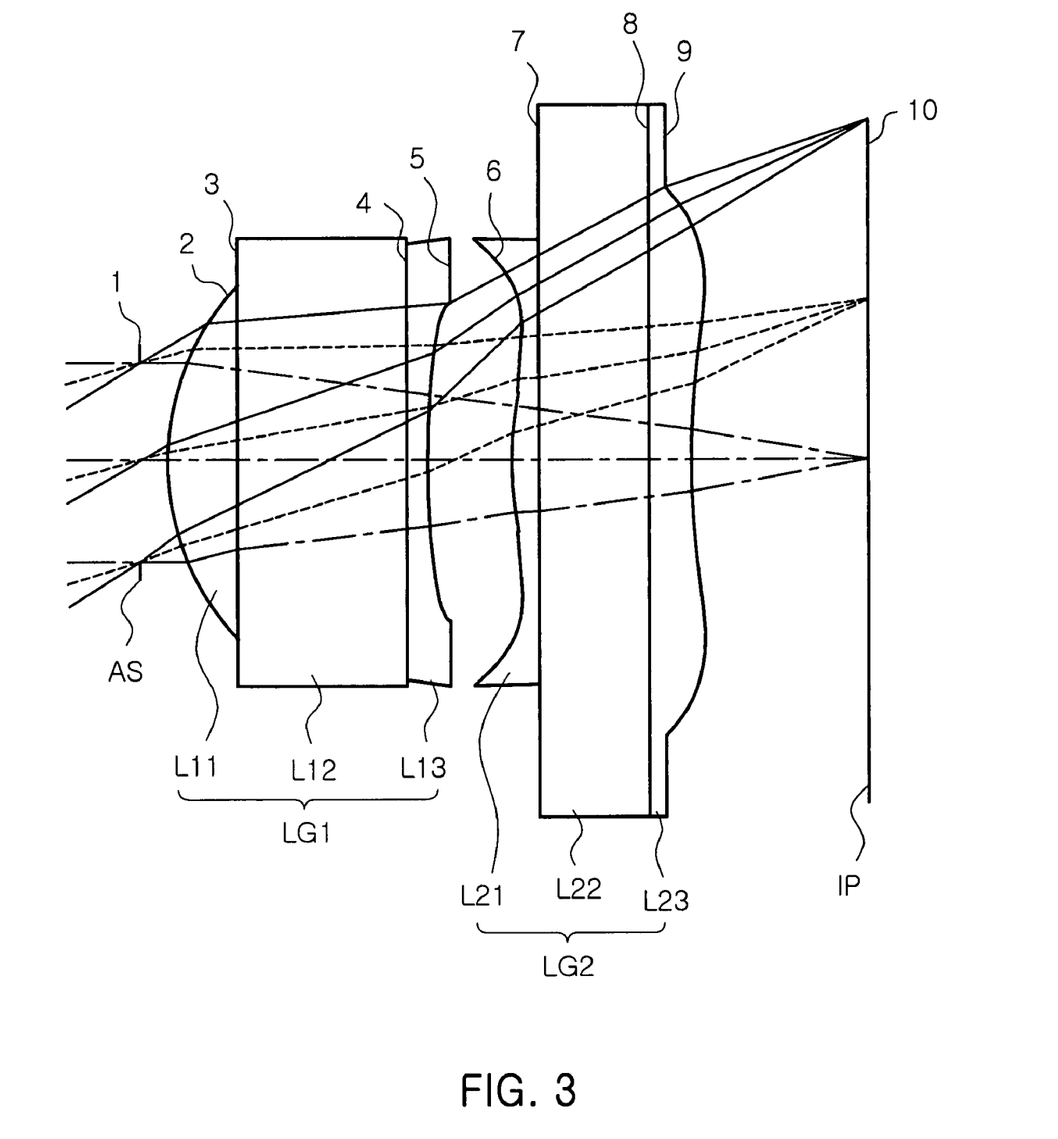
FIG. 3 is a view illustrating a lens arrangement of a subminiature imaging optical system according to a second embodiment of the present invention.
Figure 4:
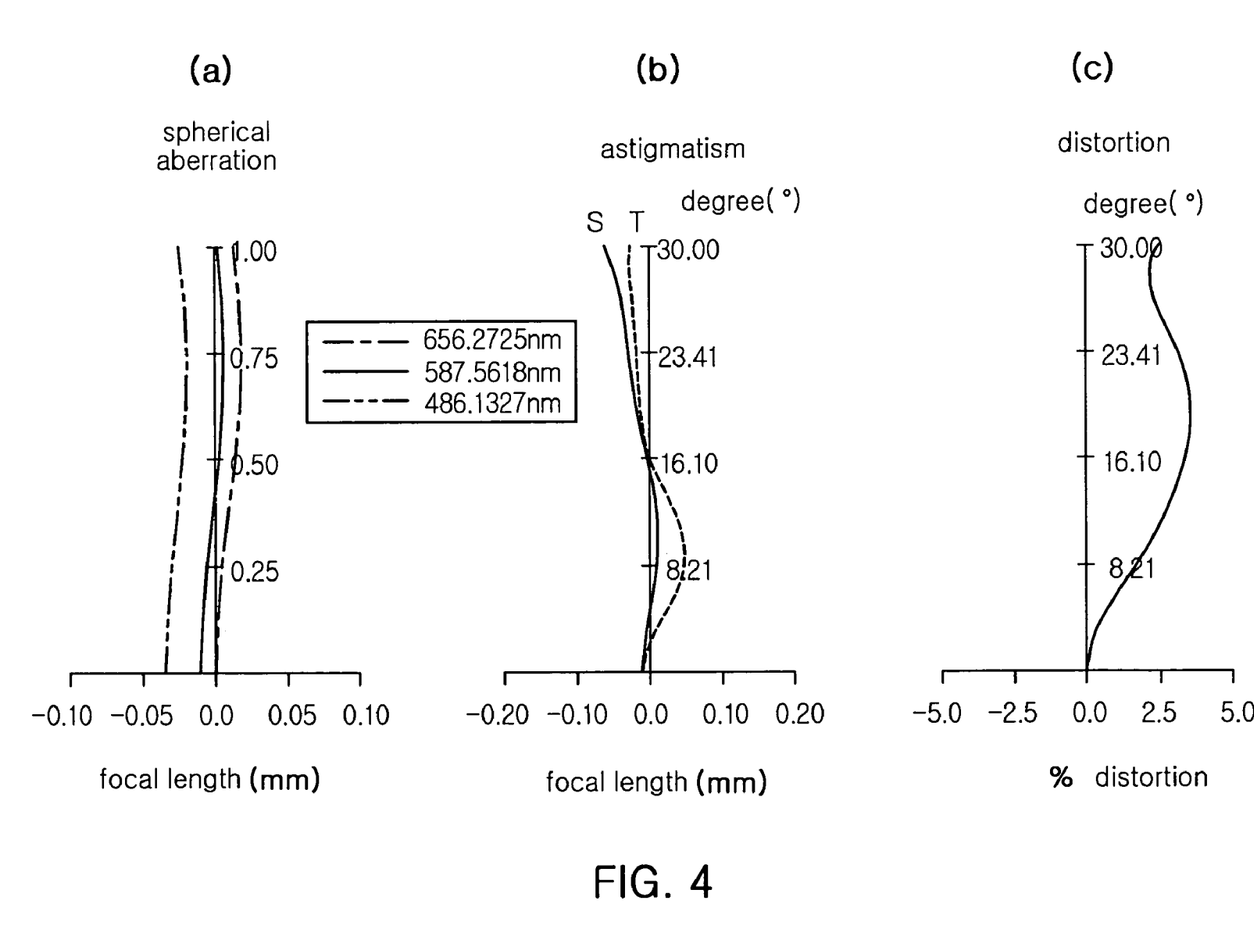
FIG. 4 illustrates aberrational characteristics of the embodiment shown in FIG. 3, in which (a) shows spherical aberration, (b) shows astigmatism and (c) shows distortion.

FIG. 3 is a view of a lens arrangement of the subminiature according to the second embodiment of the present invention, and FIG. 4 shows the aberrations of the second embodiment shown in FIG. 3, in which (a) is spherical aberration, (b) is astigmatism and (c) is distortion.

In the second embodiment, the angle of view is 60 degrees, the distance from the aperture stop surface 1 to the image plane is 2.6 mm, the effective focal length f of the optical system is 2.019 mm, the focal length f1 of the first lens LG1 is 2.63 mm, the focal length f2 of the second lens LG2 is 7.14. In addition, the largest sag value H1 of the third lens part L13 is 80 μm, the smallest sag value H2 of the fourth lens part L21 is −30 μm, the sag value within the effective aperture of the fourth lens part L21 is 19 μm, and the largest sag value H3 of the sixth lens part L23 is 50 μm.

The unit for the radius of curvature R, the thickness or the distance t is mm.

TABLE 3

| Surface No. | Radius of curvature R | Thickness or distance t | Refractive index $N_d$ | Abbe number $V_d$ | Other |
|---|---|---|---|---|---|
| 1 | ∞ | 0.1000 | | | Aperture stop |

TABLE 3-continued

| Surface No. | Radius of curvature R | Thickness or distance t | Refractive index $N_d$ | Abbe number $V_d$ | Other |
|---|---|---|---|---|---|
| *2 | 0.8493 | 0.2500 | 1.4431 | 49 | The |
| 3 | ∞ | 0.6000 | 1.474 | 65.4 | first |
| 4 | ∞ | 0.0789 | 1.4821 | 51.3 | lens |
| *5 | 2.2810 | 0.3036 | | | |
| *6 | 1.3276 | 0.0894 | 1.4431 | 49 | The |
| 7 | ∞ | 0.4000 | 1.474 | 65.4 | second |
| 8 | ∞ | 0.1458 | 1.4431 | 49 | lens |
| *9 | 1.9554 | 0.6330 | | | |
| 10 | ∞ | — | | | Image plane |

In addition, in Table 3, the symbol * represents an aspherical surface, and in the second embodiment, the second surface (the object-side surface of the first lens part), the fifth surface (the image-side surface of the third lens part), the sixth surface (the object-side surface of the fourth lens part) and the ninth surface (the image-side surface of the sixth lens part) are aspherical.

The values of the aspherical coefficients in the second embodiment according to Equation 1 are as follows in Table 4.

TABLE 4

| Surface No. | K | A | B | C |
|---|---|---|---|---|
| 2 | 0.163162 | −0.15643 | 0.519699 | −1.63154 |
| 5 | −70.1805 | 0.223508 | −0.11752 | 2.258403 |
| 6 | −35.9372 | −0.01905 | −1.59915 | 0.904728 |
| 9 | −4.27854 | −0.18522 | −0.23443 | 0.056815 |

Third Embodiment

Table 5 below shows numerical values according to the third embodiment of the present invention.

Figure 5:
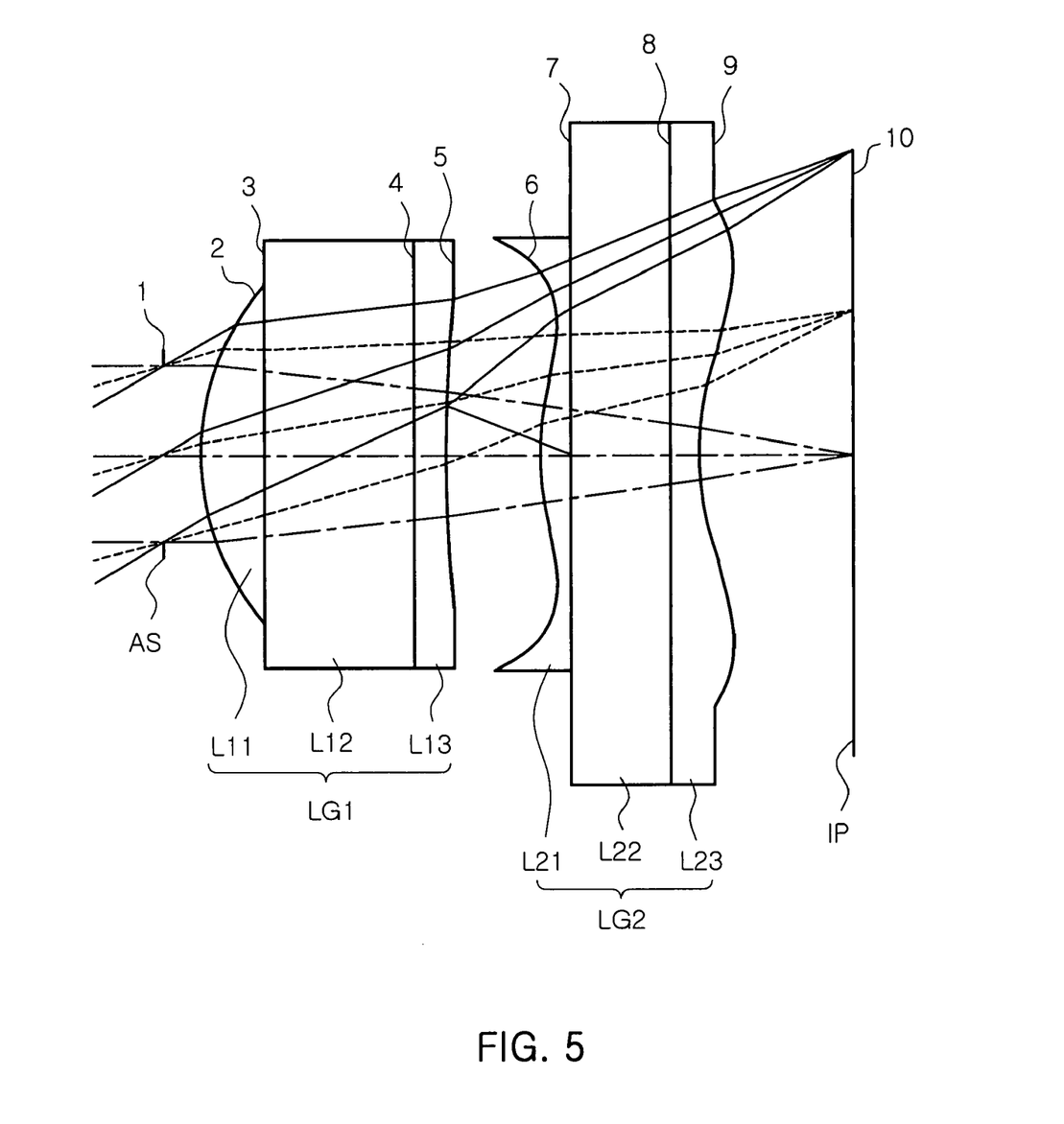
FIG. 5 is a view illustrating a lens arrangement of a subminiature imaging optical system according to a third embodiment of the present invention.

FIG. 5 is a view of a lens arrangement of the subminiature image forming optical system according to the third embodiment of the present invention, and FIG. 6 shows the aberrations of the third embodiment shown in FIG. 5, in which (a) is spherical aberration, (b) is astigmatism and (c) is distortion.

In the third embodiment, the angle of view is 60 degrees, the distance from the aperture stop surface 1 to the image plane 10 is 2.77 mm, the effective focal length f of the optical system is 2.084 mm, the focal length f1 of the first lens LG1 is 2.761 mm, and the focal length f2 of the second lens LG2 is 13.229 mm. In addition, the largest sag value H1 of the third lens part L13 is 30 μm, the smallest sag value H2 of the fourth lens part L21 is −60 μm, the sag value within the effective aperture of the fourth lens part L21 is 3 μm, and the largest sag value H3 of the sixth lens part L23 is 134 μm.

The unit for the radius of curvature R, the thickness or the distance t is mm.

TABLE 5

| Surface No. | Radius of curvature R | Thickness or distance t | Refractive index $N_d$ | Abbe number $V_d$ | Other |
|---|---|---|---|---|---|
| 1 | ∞ | 0.1538 | | | Aperture stop |
| *2 | 0.9969 | 0.2500 | 1.4431 | 49 | The |
| 3 | ∞ | 0.6000 | 1.474 | 65.4 | first |
| 4 | ∞ | 0.1300 | 1.4821 | 51.3 | lens |
| *5 | 4.1189 | 0.3807 | | | |
| *6 | 0.9739 | 0.1193 | 1.4431 | 49 | The |
| 7 | ∞ | 0.4000 | 1.474 | 65.4 | second |
| 8 | ∞ | 0.1200 | 1.4431 | 49 | lens |
| *9 | 0.9356 | 0.6128 | | | |
| 10 | ∞ | — | | | Image plane |

In addition, in Table 5, the symbol * represents an aspherical surface, and in the third embodiment, the second surface (the object-side surface of the first lens part), the fifth surface (the image-side surface of the third lens part), the sixth surface (the object-side surface of the fourth lens part) and the ninth surface (the image-side surface of the sixth lens part) are aspherical.

The values of the aspherical coefficients in the third embodiment according to Equation 1 are as follows in Table 6.

TABLE 6

| Surface No. | K | A | B | C |
|---|---|---|---|---|
| 2 | −0.02957 | −0.11548 | 0.479491 | −0.74092 |
| 5 | −448.302 | −0.06618 | 0.023534 | 0.810364 |
| 6 | −13.8888 | −0.10074 | −0.8416 | 0.102912 |
| 9 | −9.05891 | 0.094994 | −0.48042 | 0.195362 |

In the meantime, the values of conditions 1 to 4 for the above first to third embodiments are as follows in Table 7 below.

TABLE 7

| | Condition 1 (f1/f) | Condition 2 [H1(μm)] | Condition 3 [H2(μm)] | Condition 4 [H3(μm)] |
|---|---|---|---|---|
| Embodiment 1 | 1.688 | 94 | −74 | 117 |
| Embodiment 2 | 1.302 | 80 | −30 | 50 |
| Embodiment 3 | 1.325 | 30 | −60 | 134 |

As seen from the above embodiments, a subminiature imaging optical system with excellent aberrational characteristics as shown in FIGS. 2, 4 and 6 is obtained according to the present invention.

The present invention as set forth above allows a subminiature imaging optical system, which can efficiently correct various aberrations such as chromatic aberration, distortion, astigmatism, spherical aberration and field curvature, using a small number of lenses with a first lens made up of three lens parts and a second lens made up of three lens parts.

In addition, the present invention provides an imaging optical system which is ultra-miniaturized and has a high resolution while using only two sheets of lenses.

Moreover, according to the present invention, the refracting surfaces of the lens are formed of an aspherical surface in a suitable shape, thereby realizing a subminiature imaging optical system having various excellent aberrational characteristics and high resolution.

Further, a replica method can be employed to realize a subminiature optical system using a wafer-scale lens, which in turn facilitates mass production.

While the present invention has been shown and described in connection with the exemplary embodiments, it will be apparent to those skilled in the art that modifications and variations may be made without departing from the spirit and scope of the invention as defined by the appended claims.

What is claimed is:

1. A subminiature imaging optical system comprising:
a first lens having a positive refractive power and comprising a first lens part having a convex object-side surface, a second lens part having an object-side surface in contact with an image-side surface of the first lens part, and a third lens part having an object-side surface in contact with an image-side surface of the second lens part and a concave image-side surface, about an optical axis; and
a second lens comprising a fourth lens part having an object-side surface with a convex center and a concave peripheral portion, a fifth lens part having an object-side surface in contact with an image-side surface of the fourth lens part, and a sixth lens part having an object-side surface in contact with an image-side surface of the fifth lens part, the sixth lens part having an image-side surface with a concave center and a convex peripheral portion, about the optical axis.

2. The optical system of claim 1, wherein the first lens has a refractive power according to following condition 1:

$$1.3 \leq f1/f \leq 1.7 \quad \text{condition 1}$$

wherein f1 is a focal length of the first lens and f is a total focal length of the optical system.

3. The optical system of claim 1, wherein the third lens part has shapes according to following condition 2:

$$H1 \geq 30 \, \mu m \quad \text{condition 2}$$

wherein H1 is a largest sag value within an effective aperture of the third lens part, in which H1 is greater than 0, when a sag is designated as a difference between a thickness at an arbitrary position within an effective aperture of the lens and a thickness of a lens along an optical axis, based on the thickness of the lens along the optical axis.

4. The optical system of claim 1, wherein the fourth lens part has shapes according to following condition 3:

$$H2 \leq -30 \, \mu m \quad \text{condition 3}$$

wherein H2 is a smallest sag value within an effective aperture of the fourth lens part, in which H2 is less than 0, when a sag is designated as a difference between a thickness at an arbitrary position within an effective aperture of the lens and a thickness of a lens along an optical axis, based on the thickness of the lens along the optical axis.

5. The optical system of claim 2, wherein the fourth lens part has shapes according to following condition 3:

$$H2 \leq -30 \, \mu m \quad \text{condition 3}$$

wherein H2 is a smallest sag value within an effective aperture of the fourth lens part, in which H2 is less than 0, when a sag is designated as a difference between a thickness at an arbitrary position within an effective aperture of the lens and a thickness of a lens along an optical axis, based on the thickness of the lens along the optical axis.

6. The optical system of claim 3, wherein the fourth lens part has shapes according to following condition 3:

$$H2 \leq -30 \, \mu m \quad \text{condition 3}$$

wherein H2 is a smallest sag value within an effective aperture of the fourth lens part, in which H2 is less than 0, when a sag is designated as an a difference between a thickness at an arbitrary position within an effective aperture of the lens than a thickness of a lens along an optical axis, based on the thickness of the lens along the optical axis.

7. The optical system of claim 1, wherein the sixth lens part has shapes according to following condition 4:

$$50 \, \mu m \leq H3 \leq 140 \, \mu m \quad \text{condition 4}$$

where H3 is a largest sag value within an effective aperture of the fourth lens part, in which H3 is greater than 0, when a sag is designated as a difference between a thickness at an arbitrary position within an effective aperture of the lens and a thickness of a lens along an optical axis, based on the thickness of the lens along the optical axis.

8. The optical system of claim 2, wherein the sixth lens part has shapes according to following condition 4:

$$50 \, \mu m \leq H3 \leq 140 \, \mu m \quad \text{condition 4}$$

where H3 is a largest sag value within an effective aperture of the fourth lens part, in which H3 is greater than 0, when a sag is designated as a difference between a thickness at an arbitrary position within an effective aperture of the lens and a thickness of a lens along an optical axis, based on the thickness of the lens along the optical axis.

9. The optical system of claim 3, wherein the sixth lens part has shapes according to following condition 4:

$$50 \, \mu m \leq H3 \leq 140 \, \mu m \quad \text{condition 4}$$

where H3 is a largest sag value within an effective aperture of the fourth lens part, in which H3 is greater than 0, when a sag is designated as a difference between a thickness at an arbitrary position within an effective aperture of the lens and a thickness of a lens along an optical axis, based on the thickness of the lens along the optical axis.

10. The subminiature image forming optical system of claim 7, wherein H3 has a value from about 100 μm to 140 μm.

11. The subminiature image forming optical system of claim 8, wherein H3 has a value from about 100 μm to 140 μm.

12. The subminiature image forming optical system of claim 9, wherein H3 has a value from about 100 μm to 140 μm.

13. The subminiature image forming optical system of claim 1, wherein at least one of the first lens part, the second lens part and the third lens part has a refractive index different from others, and
at least one of the fourth lens part, the fifth lens part and the sixth lens part has a refractive index different from others.

14. The subminiature image forming optical system of claim 2, wherein at least one of the first lens part, the second lens part and the third lens part has a refractive index different from others, and
at least one of the fourth lens part, the fifth lens part and the sixth lens part has a refractive index different from others.

15. The subminiature image forming optical system of claim 3, wherein at least one of the first lens part, the second lens part and the third lens part has a refractive index different from others, and
at least one of the fourth lens part, the fifth lens part and the sixth lens part has a refractive index different from others.

16. The optical system of claim 1, wherein the object-side surfaces and the image-side surfaces of at least one of the second lens part and the fifth lens part are formed of a planar surface.

17. The optical system of claim 2, wherein the object-side surfaces and the image-side surfaces of at least one of the second lens part and the fifth lens part are formed of a planar surface.

18. The optical system of claim 3, wherein the object-side surfaces and the image-side surfaces of at least one of the second lens part and the fifth lens part are formed of a planar surface.

19. The optical system of claim 1, wherein at least one of the object-side surface and the image-side surface of the second lens part and the object-side surface and the image-side surface of the fifth lens part is formed of an aspherical surface.

20. The optical system of claim 2, wherein at least one of the object-side surface and the image-side surface of the second lens part and the object-side surface and the image-side surface of the fifth lens part is formed of an aspherical surface.

21. The optical system of claim 3, wherein at least one of the object-side surface and the image-side surface of the second lens part and the object-side surface and the image-side surface of the fifth lens part is formed of an aspherical surface.

22. The optical system of claim 1, wherein the second lens has a positive refractive power.

23. The optical system of claim 2, wherein the second lens has a positive refractive power.

24. The optical system of claim 3, wherein the second lens has a positive refractive power.

* * * * *

UNITED STATES PATENT AND TRADEMARK OFFICE
CERTIFICATE OF CORRECTION

| | |
|---|---|
| PATENT NO. | : 7,457,053 B1 |
| APPLICATION NO. | : 11/826974 |
| DATED | : November 25, 2008 |
| INVENTOR(S) | : Hye Ran Oh et al. |

Page 1 of 1

It is certified that error appears in the above-identified patent and that said Letters Patent is hereby corrected as shown below:

Column 11, Line 66, after "as" delete "an".

Signed and Sealed this

Third Day of March, 2009

JOHN DOLL
*Acting Director of the United States Patent and Trademark Office*